No. 822,179. PATENTED MAY 29, 1906.
W. E. BOWERSOCK.
CANCELING TOOL.
APPLICATION FILED OCT. 12, 1905.
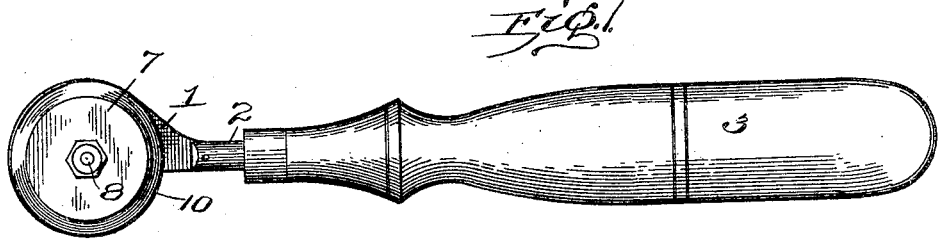
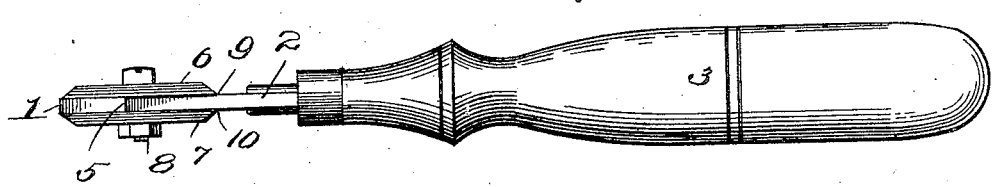
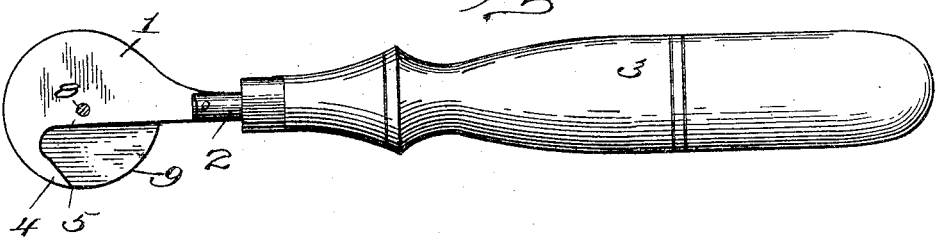
Inventor
Wilber E. Bowersock
Witnesses
J. M. Fowler Jr.
Cassell Severance
By Mason, Fenwick & Lawrence
Attorneys

UNITED STATES PATENT OFFICE.

WILBER E. BOWERSOCK, OF BURLINGTON, IOWA.

CANCELING-TOOL.

No. 822,179.  Specification of Letters Patent.  Patented May 29, 1906.

Application filed October 12, 1905. Serial No. 282,453.

*To all whom it may concern:*

Be it known that I, WILBER E. BOWERSOCK, a citizen of the United States, residing at Burlington, in the county of Des Moines and State of Iowa, have invented certain new and useful Improvements in Canceling-Tools; and I do hereby declare the following to be a full, clear, and exact description of the invention, such as will enable others skilled in the art to which it appertains to make and use the same.

This invention relates to improvements in canceling or mutilating devices, and has particular relation to devices for canceling revenue-stamps upon cigar-boxes, tobacco-caddies, whisky barrels, kegs, and the like.

It is the object of the invention to provide a canceling device in which the stamp may be cut at the sides of the mutilated part and the portion between said cuts may be removed.

With this and other objects in view the invention comprises certain novel constructions, combinations, and arrangements of parts, as will be hereinafter fully described and claimed.

In the accompanying drawings, Figure 1 represents a side elevation of a tool constructed in accordance with the present invention. Fig. 2 is a similar view, but looking at the side cutters from the edges thereof. Fig. 3 is a detail view, partially in elevation and partially in section, the section being taken just inside of one of the side cutters.

The tool or implement forming the subject-matter of this invention is so constructed that in cutting or mutilating stamps upon boxes, caddies, barrels, kegs, and the like the stamps may be severed at the side edges of the cut portion and the portion between said side edges may be scraped, cut, or taken off from the material upon which the stamp was affixed.

In carrying out the spirit of the invention I provide a head portion 1, having a shank or stem 2, which extends into and is rigidly secured to a suitable handle 3. The head 1 is formed with a portion of its edge made circular, while a part of the head is cut away upon one side and formed into a scraping-knife or cutter, as at 4. The tip or point 5 is preferably made quite sharp, so that it is capable of cutting or slicing the material over which it is passed for loosening and removing it.

The head is provided with lateral cutters, one being arranged upon each side thereof.

These lateral cutters, as indicated at 6 and 7, are preferably rotatable cutters, and a shaft or pivot-bolt 8 is passed through the center of said cutters and through the head 1 to movably hold the cutters in position. The lateral cutters are practically cutting-disks, and said lateral cutters or disks are beveled upon their peripheral edges, so as to form sharp cutting portions at 9 and 10. These bevels extend from the outer surface inwardly to the cutting edges 9 and 10, so that said cutting edges fit closely against the side edges of the cutting-point 4, as clearly shown in Fig. 2. The cutters 6 and 7 are mounted sufficiently loosely upon a pivot-bolt 8 so that they may be rolled upon the surface which is to be cut or mutilated.

It will be observed by reference to Fig. 2 that a transversely-arranged cutting edge 5 extends from one lateral cutter 6 to the other lateral cutter, completely bridging the space between the two lateral cutting edges. By this arrangement all of the mutilated surface between the said lateral cutters will be scraped by the transverse cutting edge 5.

In using the implement or tool it is grasped by the handle, and the said handle is held at an angle of about forty-five degrees to the surface of the stamp to be mutilated, and the tool is then drawn forward over the same. Sufficient pressure is exerted upon the tool to cause the lateral rolling disk cutters to sever the material at the sides, and the material thus severed between the cutters will be scraped or lifted by the transverse cutter 5 and removed from the article to which the stamp was affixed.

The side rolling or disk cutters are preferably made of no greater diameter than the head 1, so that the sharp cutting edges will not project sufficiently to come in contact with anything except oppositely cut-away portions of the head, by which the transverse cutter is formed. The cutting edges of the lateral cutters will thus not be exposed for engaging the hands or clothes of the operator or so as to be damaged themselves by striking articles when they are laid down or when the tool is moved from place to place.

In use the tool is found exceedingly handy for quickly and effectively cutting and mutilating revenue-stamps placed upon various packages or closures in which dutiable articles are packed, it only being necessary to grasp the handle and draw the device over the stamp to accomplish a sufficient mutilation to meet the requirements of the laws affecting such matters.

Having now described my invention, what I claim as new, and desire to secure by Letters Patent, is—

1. In a cutter, a circular head having an outstanding shank and a recess adjacent the shank, cutting-disks mounted upon opposite sides of the head, and a lateral scraping edge occupying the interval between the disks.

2. In a cutter, a circular head having an outstanding shank and a recess adjacent the shank, defining a lateral scraping edge, cutting-disks mounted upon opposite sides of the head, and with the lateral scraping edge occupying the interval between the disks.

3. In a cutter, a circular head having an outstanding shank and a recess adjacent the shank, cutting-disks corresponding in size to and mounted to rotate upon opposite sides of the head, and a lateral scraping edge occupying the interval between the disks.

4. In a cutter, a circular head having an outstanding shank and a recess adjacent the shank defining a lateral scraping edge, cutting-disks corresponding in size to and mounted to rotate upon opposite sides of the head, and with the lateral scraping edge occupying the interval between the disks.

5. In a cutter, a circular head having an outstanding shank and a recess adjacent the shank defining a lateral scraping edge formed at the periphery of the head, cutting-disks mounted upon opposite sides of the head and with the lateral scraping edge occupying the interval between the disks.

6. In a cutter, a circular head having an outstanding shank and a recess adjacent the shank defining a lateral scraping edge formed at the periphery of the head, cutting-disks corresponding in size to and mounted to rotate upon opposite sides of the head, with the lateral cutting edge occupying the interval between the disks.

7. In a cutter, a circular head having an outstanding shank and a recess adjacent the shank, cutting-disks corresponding in size to and mounted to rotate upon opposite sides of the head and with their cutting peripheries in juxtaposition thereto, and a lateral scraping edge occupying the interval between the disks.

8. In a cutter, a circular head having an outstanding shank and a recess adjacent the shank defining a lateral scraping edge formed at the periphery of the head, cutting-disks corresponding in size to and mounted to rotate upon opposite sides of the head and with their cutting peripheries in juxtaposition thereto, and with the lateral scraping edge occupying the interval between the disks.

In testimony whereof I affix my signature in presence of two witnesses.

WILBER E. BOWERSOCK.

Witnesses:
   THOS. GREEN,
   CARRIE INGHRAM.